United States Patent [19]

Stenger

[11] 3,713,716

[45] Jan. 30, 1973

[54] ADAPTOR FOR TAPE TRANSPORT TRUCK AND THE LIKE

[76] Inventor: Hanns G. Stenger, 70-11 34th Ave., Jackson Heights, N.Y. 11372

[22] Filed: Feb. 24, 1971

[21] Appl. No.: 118,223

[52] U.S. Cl. ..................312/107, 312/111, 312/250, 312/10

[51] Int. Cl. ..............................................A47b 87/00

[58] Field of Search......312/293, 286, 250, 237, 194; 220/18, 85; 206/19.5 R, 19.5 G, 19.5 D

[56] References Cited

UNITED STATES PATENTS

| | | | |
|---|---|---|---|
| 3,379,482 | 4/1968 | Baggott | 312/350 |
| 305,544 | 9/1884 | Stirrup | 312/297 |
| 2,726,035 | 12/1955 | Meissner | 220/18 X |
| 3,008,785 | 11/1961 | Gehrs | 312/293 X |
| 2,716,046 | 8/1955 | Minturn | 312/286 |
| 2,323,957 | 7/1943 | Zalkind | 312/107 |
| 3,433,547 | 3/1969 | Hoaglund | 312/111 |
| 3,446,544 | 5/1969 | Serwer | 312/111 |

*Primary Examiner*—James T. McCall
*Attorney*—Howard E. Thompson, Jr. and Salvatore C. Mitri

[57] ABSTRACT

An adaptor for tape transport trucks and similar carts of the type generally employed in computer installations is provided having means for retaining labels, identification cards, and the like, in an orderly arrangement as well as storing therein miscellaneous business items such as rubber bands, paper clips, marking pencils, and the like. The adaptor of the invention is designed so that it can be detachably secured to tape transport trucks, carts, or similar vehicles with the upper portion thereof being a planar surface which can be used as a writing area, and which can be provided with a lip so that additional tapes or similar articles can be temporarily stored on the planar surface.

Although the adaptor of the invention is designed to be utilized in conjunction with tape transport trucks and carts, it can also be employed as a separate unit since it is provided with means for detachably securing it to such tape transport trucks and carts.

3 Claims, 5 Drawing Figures

PATENTED JAN 30 1973

3,713,716

INVENTOR.
HANNS G. STENGER

BY Howard E. Thompson Jr.

ATTORNEY

ADAPTOR FOR TAPE TRANSPORT TRUCK AND THE LIKE

THE INVENTION

This invention relates to a new and useful assemblage for use as an adaptor on tape transport trucks, wheeled carts, and the like, of the type generally used in computer installations, the adaptor having means for orderly storeage and arrangement of identification labels, cards and other miscellaneous items utilized in conjunction with computer operations and is provided with a planar surface which can serve as a tape storeage area or which can be employed as a writing surface.

BACKGROUND OF THE INVENTION

It is well known that in the field of electronics, the technology applied to the computer industry has advanced and progressed at an amazing rate so that most computer installations are now using third and fourth generation computers and associated mechanisms. While this advancement in computer technology continues at a rapid rate, the auxiliary hardware necessary to service this rapid growth has remained stagnant. Hence, while computer equipment and technology can be thought of as being in the "age of rocketry," the supporting, auxiliary hardware can be thought of as still existing in the "age of the stagecoach." In particular, one type of auxiliary equipment utilized in computer operations are those wheeled vehicles referred to as "tape transport trucks." These trucks are utilized to transport computer tapes from a tape library where they are stored to the computer installation area where they are utilized and, after being used, are returned again to the tape storeage library.

The computer tapes generally employed with computers are of two types: input tapes which contain information that is to be "read" into the computer, and output tapes from which information is printed by the computer. During operation, the computer operator has to identify each output tape with an identification label and also identify the tape on a prepunched card. Since most computer installations are running on a 24 hour basis, an operator handles a great number of such tapes and, therefore, has a substantial number of such identifying labels and prepunched cards for each separate job that is to be handled by the computer, as there may be several such tapes for each job to be run.

The identifying labels and prepunched cards are provided to the operator when the computer tapes are delivered to him from the library. Since it is normal practice for an operator to run off several jobs concurrently, the operator has a great deal of difficulty in keeping the identification labels and prepunched cards associated with the proper tapes for each job separate from each other and yet have them readily available when the labels and cards are to be affixed to the proper tapes at the end of a run.

Another difficulty encountered in computer operations involves the bands, typically referred to as "write rings," utilized with computer tapes. These write rings are secured to the perimeter of computer reels and serve to trigger a mechanism in a computer whereupon the computer will "write" the tape on the reels. These tapes are the output tapes referred to above.

Input tapes, on the other hand, do not have write rings attached to them so that a groove is exposed on the perimeter of the reel where the write rings would normally be secured. Consequently, there is nothing on these input reels to trigger the writing mechanism of the computer so that instead of writing these input tapes, the computer is programmed to receive information from these input tapes.

It can be seen, therefore, that it is important that write rings not be erroneously secured to input tapes so that these tapes will not be accidentally written by the computer. On the other hand, if the write rings are not removed from the output tapes, they will be written by the computer thereby erasing the data already contained on them. When this does occur, many hours are lost since the information erased must again be gathered from its various sources and reprinted by the computer on another tape.

Write rings are also important to the tape librarian since most of the tapes sent from the tape library are output tapes and must, therefore, have write rings attached to them. Under present conditions, the computer operator, after removing the write rings from the output tapes, has no place to put them, and, as a result, they become strewn about the computer installation area. Hence, when the tape librarian has need for additional write rings to be secured to output tapes, he must go into the computer installation area to collect them, then properly affix them to the output tapes so that they will be ready when the job or jobs which they contain are called upon to be run through the computer. As a result, more time is lost, effort is wasted and a great deal of confusion is created.

THE INVENTION

It has now been found that the problems associated with accurate labeling of and affixing prepunched cards to computer tapes as well as those problems associated with proper placement and availability of write rings can be overcome through the use of the adaptor of the invention. In general, the adaptor of the invention is an assemblage comprising a rectangular housing having a plurality of shallow drawers equipped with means for retaining therein pre-punched identification cards and/or labels which pertain to a single job in one location; a planar surface for use as a writing area and which can be adapted to store additional tapes thereon; means to collect and store write rings removed from output tapes; and, means to detachably secure the adaptor to the top of a tape transport truck.

The means to retain pre-punched cards and labels in the drawers in an orderly arrangement can be provided by a plurality of spaced spring clips secured to the bottom of each drawer while the planar surface can be adapted for additional storage of tapes by providing a short lip or flange storeage its perimeter. The means for collecting and storing removed write rings can be provided by a detachable, translucent or transparent container, and the entire assemblage can be adapted to be detachably secured to the top of a tape transport truck or other similar cart by such means as machine screws, button snaps and the like.

The adaptor of the invention will become more clear when considered together with the accompanying drawing wherein the several figures illustrate various embodiments thereof and wherein.

Figures 1, 2:
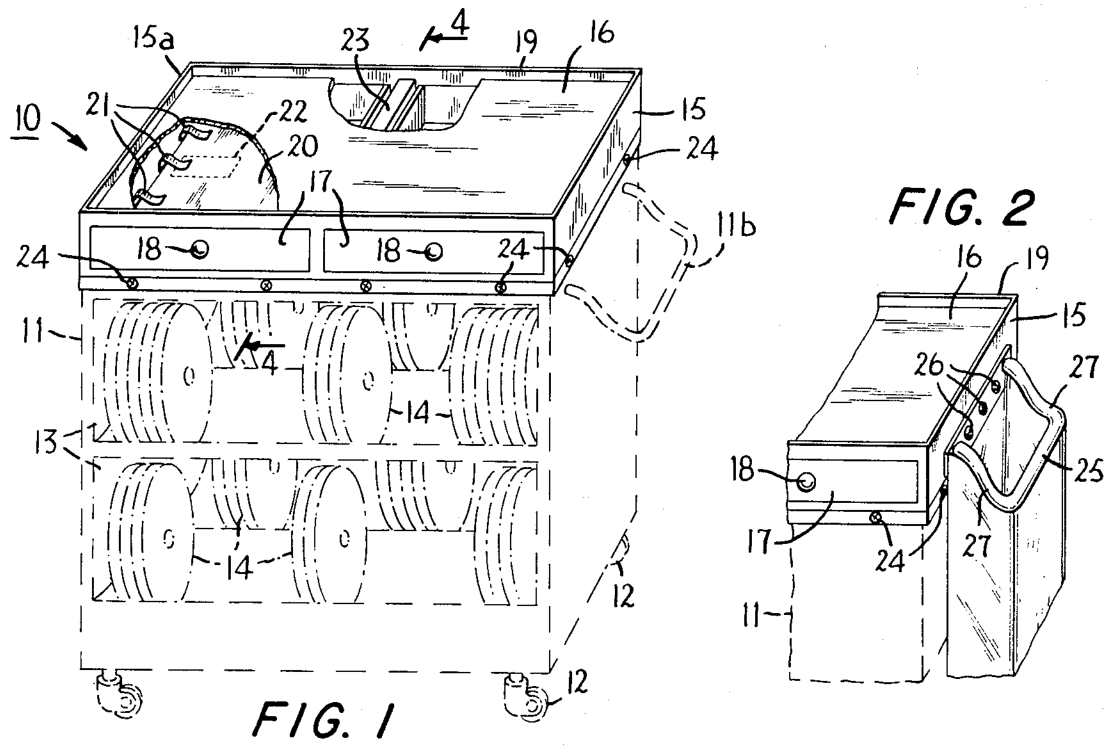
FIG. 1 is a perspective view, part broken away, illustrating the adaptor of the invention mounted to the top of a tape transport truck which is shown in dotted lines.
FIG. 2 is a fragmentary perspective view illustrating one embodiment of a container which can be employed to collect and store write rings.
Figure 3:
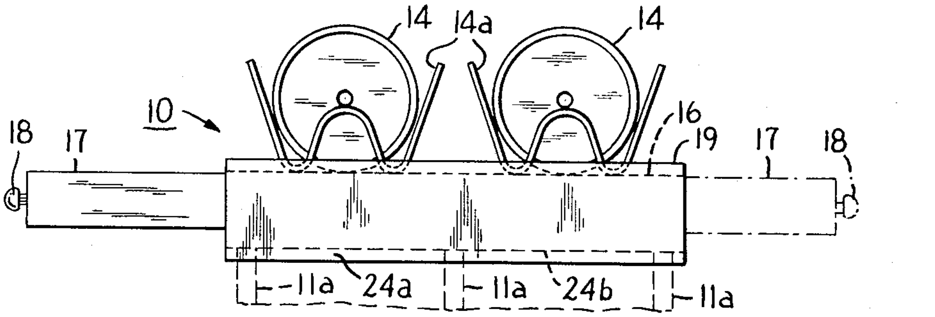
FIG. 3 is a side elevation view of a portion of the adaptor shown in FIG. 1.

As shown in FIG. 1, the adaptor of the invention comprises a rectangular housing, generally indicated by reference numeral 10, mounted to the top of a tape transport truck 11 which is provided with wheels 12 for mobility and storeage areas 13 for carrying a plurality of tapes 14 therein. The ends of the adaptor housing 10 are enclosed by end walls 15, 15*a* and the top is provided with a planar surface 16 which can be utilized as a writing area. Intermediate ends 15, 15*a* there is provided a plurality of shallow drawers 17 each of which is appropriately equipped with means for opening and closing them, such as knobs indicated at 18. While only two such drawers 17 are shown it should be understood that additional drawers can be provided at the same level or stacked one upon the other vertically depending upon the height of the adaptor 10.

Where it is desired to utilize the planar surface 16 as an additional tape storeage area, it can be provided with a shallow lip or flange 19 running about its perimeter so that tapes 14 can be stacked upon it such as in racks 14*a* as shown in FIG. 3, and yet still utilize a portion of it as a writing surface.

To the bottoms 20 of one or more drawers there can be affixed a plurality of spaced retaining means such as spring clips, as shown at 21, which can be utilized to retain prepunched cards or labels 22 pertaining to and/or identifying a job or a series of operations relating to a job. When additional drawers 17 are provided, they can be utilized to store associated miscellaneous materials and supplies such as marking pencils, rubber bands, paper clips, note paper and the like.

When the planar surface 16 of the adaptor 10 is provided with a shallow flange 19 and tapes 14 are stored thereon, it is preferred that the planar surface 16 be reinforced in order to support the added weight of tapes 14 placed upon it. This can be readily achieved by including a support beam within the adaptor 10 between the drawers 17 transverse to the length of the adaptor as shown at 23. (FIG. 1). Support beam 23 and/or end walls 15, 15*a* provide the guide means for drawers 17.

The adaptor 10 can be readily secured to the tape transport truck 11 by means of a plurality of machine screws or button snaps as indicated at 24. Where the upper portion of tape transport trucks 11 are not provided with a flat shelf or surface, other means can be utilized to secure the adaptor 10 to the tops of the tape transport truck 11 such as by employing brackets, tension springs, and the like as is well known to those skilled in the art. In FIG. 3, for example, adaptor 10 is shown secured to the upper ends of vertical supports 11*a* by means of a flange 24*a* extending downwardly from the bottom 24*b* of adaptor 10 closely interfitting with supports 11*a* of the tape transport truck. If desired, however, the adaptor of the invention can be provided as an integral, permanent part of the tape transport truck 11.

In another embodiment of the invention, one end wall of the adaptor 10, such as 15 (FIG. 2), is adapted to support a write ring container 25 which can be secured to side 15 by machine screws, button clips, and the like as shown at 26 in the same manner as the adaptor 10 is secured to the tape transport truck 11. Container 25 can be of any desired length, width and/or depth consistent with the dimensions of tape transport truck 11 so that when it is secured to the adaptor 10, it provides ready means on the tape transport truck 11 for collecting the write rings as they are removed from the output tapes. After container 25 has been filled with write rings, it can be delivered to the library, thereby providing for a cleaner and more orderly operating area while reducing the effort and confusion presently created from gathering and collecting the write rings. Most tape transport trucks 11 are equipped with a handle 11*b*, (FIG. 1) to facilitate moving them about and container 25 can also be adapted with sleeve members, as shown in FIG. 2 at 27, of a dimension so that they can be readily slipped over handle 11*b*, to further impart additional shape and form to container 25 suspended from handle 11*b*.

Since the tape transport truck 11 will normally be found in the center of hectic activity in the computer installation area, and since the identifying cards or labels for the tapes must be quickly and readily accessible, it is preferred that the interior of drawers 17 of the adaptor 10 be accessible from either side of the tape transport truck 11. Hence, in a preferred embodiment, the drawers 17 should be made so that they can be opened from both sides of the tape transport truck 11 as shown in the full and dotted line positions in FIG. 3. In such instances, it is important that drawers 17 be provided with means to arrest their movement in each direction so that they will not be completely pulled out of the adaptor 10, but the extent to which drawers 17 are arrested should be such that the contents within them remain readily accessible.

Figures 4, 5:
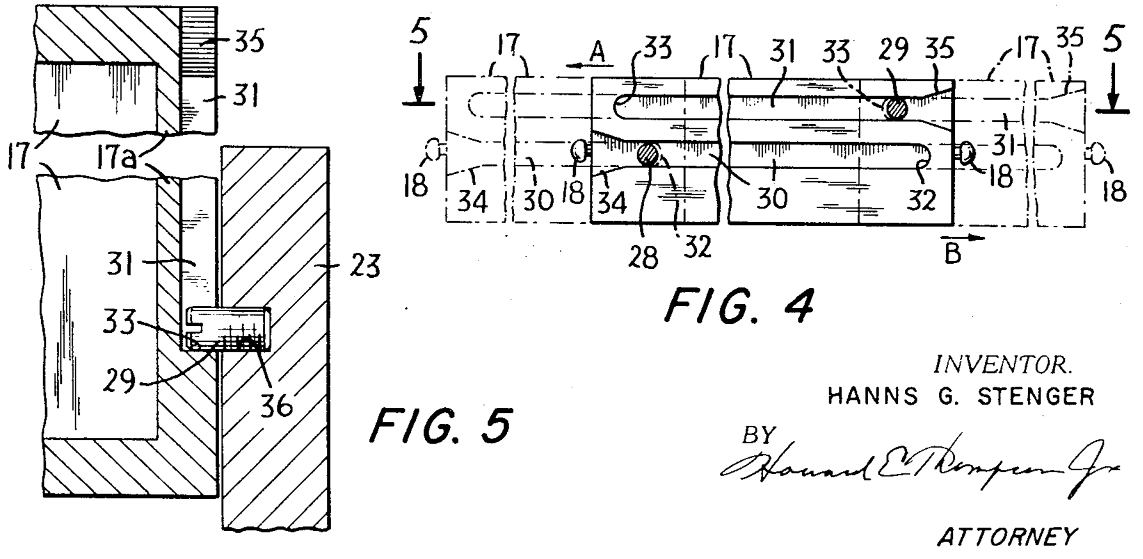
FIG. 4 is a view of a drawer side taken substantially on the line 4—4 of FIG. 1 showing means which can be employed for controlling the extent of opening of the drawers; and, FIG. 5 is a fragmented sectional view taken substantially on the line 5—5 of FIG. 4.

One such means by which this can be accomplished is illustrated in FIGS. 4 and 5. As shown therein support beam 23 is provided with a pair of pegs 28, 29 at opposite ends thereof. Pegs 28, 29 are aligned so that each engages grooves 30, 31 formed in the side wall 17*a* of drawer 17 adjacent support beam 23. One end of each groove is closed as at 32, 33 while its other end is open and preferably flared as at 34, 35 to facilitate receiving pegs 28, 29 therein.

When a drawer 17 is opened, as in the direction of arrow A in FIG. 4 and shown in dotted lines, peg 28 engages the closed end 32 of groove 30 to arrest further advance of drawer 17 in that direction. Similarly, peg 29 engages the closed end 33 of groove 31 when drawer 17 is opened in the direction of arrow B, also shown in dotted lines. When drawer 17 is closed, the relative positions of the closed ends 32, 33 of grooves 30, 31 with respect to pegs 28, 29 will be as shown by the full lines of FIG. 4.

Pegs 28, 29 can be secured in the sides of support beam 23 by frictionally engaging them in appropriately dimensioned recesses as at 36 (FIG. 5) or threadably securing them therein, thereby facilitating assembly and disassembly of drawers 17.

Although pegs 28, 29 have been illustrated as being carried in support beam 23, it should be understood that they can be similarly provided in the end walls 15, 15*a* of adaptor 10 and aligned therein to engage similar grooves provided in those walls of drawers 17 adjacent thereto.

It should be further understood that while drawers 17 can be directly slidable in the adaptor of the invention as described above, smoother opening and closing of drawers 17 can be obtained by providing movable guides and rollers (not shown) such as the type conventionally employed in desk drawers, file cabinets, and the like.

Although the adaptor of the invention has been described with particularity and in some detail, it should be understood that changes, variations and modifications can be made therein, in addition to those suggested herein, without departing from the scope and spirit of the invention.

What is claimed:

1. An adaptor for tape transport trucks utilized in computer installations comprising: a rectangular housing having opposed end walls; a guide means supporting a plurality of drawers between said end walls; a planar surface enclosing the upper portion of said housing; means within said drawers comprising spring members yieldably bearing against said drawer bottoms for retaining in segregated areas a plurality of prepunched cards and labels used to identify tapes employed to run a job and tapes employed to run a plurality of operations in one job; means for detachably securing a container for the collection and storage of write rings adjacent one of said end walls; and, means for detachably mounting said housing to the upper portion of a tape transport truck.

2. The adaptor as defined in claim 1 wherein the perimeter of said planar surface is provided with a shallow flange such that the storeage capacity of tapes for said tape transport truck is increased.

3. The adaptor as defined in claim 1 wherein said drawers are adapted to be opened from either side of said tape transport truck by use of cooperating means and said guide means which limit the extent to which said drawers can be opened in each direction, said cooperating means comprising a plurality of parallel grooves on a drawer side, each of said grooves having an open end and a closed end with the open ends thereof disposed at opposite ends of said drawer sides; and, a plurality of pegs mounted in said guide means, each of said pegs registering with one of said grooves and positioned at the open end of its registered groove when said drawer is in its closed position.

* * * * *